United States Patent [19]

Hou et al.

[11] 4,038,667
[45] July 26, 1977

[54] INK JET INK SUPPLY SYSTEM

[75] Inventors: Shou L. Hou; Robert D. Carnahan, both of Barrington, Ill.

[73] Assignee: Gould Inc., Rolling Meadows, Ill.

[21] Appl. No.: 681,338

[22] Filed: Apr. 28, 1976

[51] Int. Cl.² ............................................. G01D 15/18
[52] U.S. Cl. ............................................... 346/140 R
[58] Field of Search ............................ 346/140 R, 75

[56] References Cited

U.S. PATENT DOCUMENTS

| 3,661,304 | 5/1972 | Martinez | 346/75 X |
| 3,974,508 | 8/1976 | Blumenthal | 346/140 R |

Primary Examiner—Joseph W. Hartary
Attorney, Agent, or Firm—Leydig, Voit, Osann, Mayer & Holt, Ltd.

[57] ABSTRACT

An ink supply system for an ink jet, or an array of ink jets, is disclosed in which an on-off valve is interposed in the conduit between the ink reservoir and the droplet forming nozzle, and a second source of ink under pressure is connected through a normally closed valve to the conduit between the nozzle and the on-off valve. To initially prime the nozzle, the on-off valve is closed, a vacuum pulled on the nozzle, and the valve opened to fill the conduit and nozzle. To reprime or clear obstructions such as dirt particles, the on-off valve is closed and the normally closed valve briefly opened to send a pulse of ink to and through the nozzle. With both valves closed during shipping or storage, the likelihood or ink being dislodged from the nozzle or conduit so as to deprime the nozzle is minimized.

2 Claims, 1 Drawing Figure

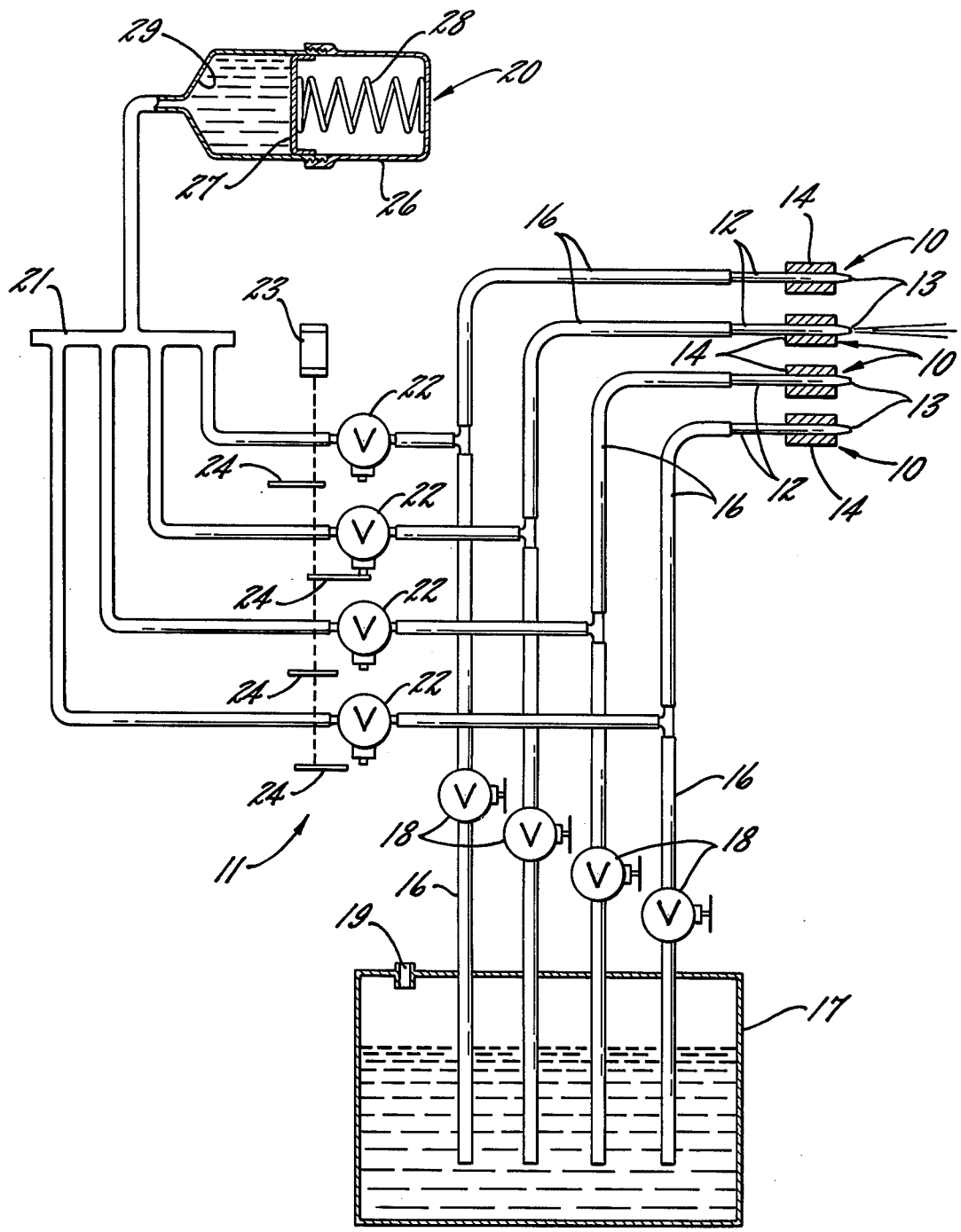

INK JET INK SUPPLY SYSTEM

The present invention relates generally to ink jet writing devices and more particularly concerns an ink supply system for such devices.

Ink jets are non-contact writing devices which produce trace lines by propelling droplets of ink against the medium being printed upon. One class of such devices is the impulse ink jet in which ink droplets are ejected upon receipt of an electrical signal or at a rate dictated by signal frequency. Devices of this kind are disclosed and claimed in U.S. Pat. No. 3,683,212, issued Aug. 8, 1972, and its related divisional U.S. Pat. Nos. 3,840,758, 3,857,049 and 3,902,083. Typically, an impulse ink jet includes an ink ejecting nozzle having an orifice diameter of 2-3 mils, a conduit for conveying ink to the nozzle, and a transducer for pulsing ink droplets from the orifice.

To operate properly, an ink jet must normally be primed with clean, air bubble-free ink. Because of the small orifice opening, even small bits of foreign matter can plug or otherwise interfere with proper operation. In an impulse ink jet, because ink droplet ejection results from mechanically squeezing the ink near the nozzle orifice, air bubbles adversely affect operation since they are capable of absorbing a compression pulse without ejecting an ink droplet. Even after initial proper priming, an impulse ink jet may draw in an air bubble through the nozzle, or a mechanical shock as when the device is being shipped or installed may dislodge ink to create a bubble, or during storage or extended non-use ink leakage can cause bubble formation. In any of these ways, an ink jet can become deprimed.

It is the primary aim of the invention to provide an ink jet ink supply system which minimizes the possibility of the ink jet becoming deprimed during shipping or storing, and which facilitates repriming of the ink jet should that be necessary. More particularly, it is an object of the invention to provide such an ink supply system which is well suited for devices using a plurality of ink jets since the system provides for selective priming of any one of an array of ink jets without affecting the other jets.

Another object is to provdie an ink supply system of the above character which gives the operator of the writing device easy pushbutton and fingertip control of the repriming function with a minimum of mess even when a number of ink jets are embodied in the device.

A further object is to provide an ink supply system as referred to above which economically increases the reliability and proper performance of an ink jet writing device by both minimizing the likelihood of depriming and by making repriming, when required, quick and convenient.

Other objects and advantages of the invention will be apparent upon reading the following detailed description and upon reference to the drawing, in which:

The figure shows schematically an ink supply system for a plurality of ink jets embodying the invention.

While the invention will be described in connection with a preferred embodiment, it will be understood that we do not intend to limit the invention to that embodiment. On the contrary, we intend to cover all alternatives, modifications and equivalents as may be included within the spirit and scope of the invention as defined by the appended claims.

Turning to the drawing, there is shown an array of ink jets 10 associated with an ink supply system 11 embodying the invention. The ink jets 10 are impulse ink jets of the kind shown in U.S. Pat. No. 3,683,212, issued Aug. 8, 1972, and include nozzles 12 with droplet forming orifices 13 from which ink droplets are ejected when electrical signals are received by piezoelectric transducers 14. Ink is conveyed to the nozzles 12 by capillary conduits 16 extending from the nozzles to and into a common ink reservoir 17. On-off valves 18 are interposed in each of the conduits 16 and, preferably, the reservoir 17 is closed except for an air vent-pressurizing tube 19.

In order to initially prime the nozzles 12, the technique of vacuum priming is preferably used. To accomplish this, the valves 18 are opened and the reservoir 17 air-pressurized through the tube 19 to an extent sufficient to drive ink past the valves 18 to points in the conduits 16 between the on-off valves 18 and the nozzles 12. The valves are thereupon closed, trapping some ink in the conduits 16 and forming gas tight seals in the conduit. A vacuum pump is attached to the orifices 13 of the nozzles 12 and, when a vacuum is drawn in each nozzle and the adjacent length of conduit, the associated valve 18 is opened allowing ink to flow to and through the nozzle. This technique virtually insures that no air bubbles are trapped in the system. The capillary conduits 16 thereafter supply ink without requiring continued pressurization of the reservoir 17.

In accordance with the invention, a second source 20 of ink under pressure is connected through a manifold 21 and normally closed valves 22 to the conduits 16 between the nozzles 12 and the on-off valves 18. Preferably, a single electromagnetic actuator 23 is provided with positionable abling elements 24, one for each of the normally closed valves 22. By manually positioning one or more of the elements 24, pushbutton energization of the actuator 23 causes the selected valve 22 to open. The source 20 comprises, in the illustrated embodiment, a two-part bottle 26 threaded together and containing a plunger 27 biased by a spring 28 to pressurize ink in a supply chamber 29 that opens to the manifold 21. Preferably, ink pressures on the order of 15 to 45 psi are established by the spring 28.

In operation, when the operator notes one of the ink jets 10 malfunctioning, the associated element 24 is manually moved to abling position and the associated manual valve 18 turned off. The operator, perhaps holding a protective piece of paper in front of the jet 10 to be primed, then energizes the actuator 23 to open the abled valve 22. This allows a surge of ink from the source 20 to pressure charge the selected nozzle 12 and drive a squirt of ink from the nozzle orifice 13 that will also carry with it, and expel, dirt particles and air bubbles; thus repriming the jet. While only four ink jets 10 are illustrated, it is obvious that a much larger array may be provided but, in the manner described, only the jet needing repriming is charged with pressurized ink so that there is little mess or spillage.

When the unit embodying the ink jets 10 is to be shipped or stored, the on-off valves 18 are turned off. The normally closed valves 22 remain closed, and the result is that ink is trapped in relatively short lengths of capillary conduit and within the nozzles 12. This minimizes the likelihood of the jets 10 becoming deprimed as a result of mechanical shock or slow flow of ink back to the reservoir 17.

Because in normal operation the reservoir 17 is not pressurized, normal maintenance of the system 11 simply involves insuring that the reservoir 17 is kept filled with ink above the lower ends of the conduits 16. The pressurized ink source 20, being called upon only for occasional repriming of one of the jets 10, is not required to supply more than a small amount of ink over extended periods and hence needs little maintenance.

Once the ink jets 10 are initially primed, fingertip manipulation of the valves 18, 22 and pushbutton operation of the actuator 23, steps well within the skill of an average operator, are effective to maintain the ink jets 10 in primed, ready-to-write condition.

Those skilled in the art will also appreciate that the system 11 can be economically manufactured of parts unlikely to present frequent maintenance problems.

We claim as our invention:

1. In an ink jet writing device including a droplet forming nozzle, a transducer for ejecting ink droplets from said nozzle and a capillary conduit for conveying ink from a reservoir to said nozzle, the combination comprising, an on-off valve interposed in said conduit for selectively blocking said nozzle from said reservoir thereby allowing the nozzle to be vacuum primed and, once primed, to trap ink in the nozzle during shipping and storage, a second source of ink under pressure connected through a normally closed valve to said conduit between said on-off valve and said nozzle, and means for intermittently opening said normally closed valve so as, when said on-off valve is closed, to pressure charge said nozzle with ink and drive a squirt of ink from said nozzle so as to clear any dirt or bubbles from the nozzle and reprime the jet.

2. In an ink jet writing device including an array of droplet forming nozzles each having a transducer for ejecting ink droplets from the respective nozzles and a plurality of capillary conduits for conveying ink from a reservoir to respective ones of said nozzles, the combination comprising, a plurality of on-off valves with one valve interposed in each of said conduits for selectively blocking one of said nozzles from the reservoir, thereby allowing the nozzles to be vacuum primed and, once primed, to trap ink in the nozzles during shipping and storage, a second source of ink under pressure connected through a manifold and a plurality of normally closed valves to respective ones of said conduits between each said on-off valve and the associated nozzle, an actuator, and means for selectively coupling said actuator to any one of said normally closed valves so as to pressure charge said associated nozzle with ink and drive a squirt of ink from that nozzle so as to clear any dirt or bubbles from the nozzle and reprime that jet.

* * * * *